United States Patent [19]
Allen

[11] 3,827,405
[45] Aug. 6, 1974

[54] CANISTER BAIL FOR POULTRY FEEDER
[75] Inventor: Dee Dexter Allen, Zeeland, Mich.
[73] Assignee: U.S. Industries, Inc., New York, N.Y.
[22] Filed: Mar. 30, 1973
[21] Appl. No.: 346,421

[52] U.S. Cl. .................................................. 119/53
[51] Int. Cl. ....................... A01k 05/00, A01k 39/00
[58] Field of Search.................... 119/52 R, 53, 53.5

[56] References Cited
UNITED STATES PATENTS
1,790,045   1/1931   Harvey............................... 119/52 R OTHER PUBLICATIONS
"Feed More Turkeys with Less Equipment with the New Big Dutchman Heavy Duty/High Capacity Feeding System" Copyright 1971 2 pages.

Primary Examiner—Hugh R. Chamblee
Attorney, Agent, or Firm—Price, Heneveld, Huizenga & Cooper

[57] ABSTRACT

A cup-shaped feed pan is suspended from a feed container by a pair of U-shaped bail hooks, the web portion of which is pivotally attached to the pan bottom. The upper ends of the hook arms include a first portion extending inwardly, and a second portion extending laterally outwardly, generally parallel to the web. The container includes similar sets of vertically spaced laterally extending slots interconnected by a vertical slot for receiving the end portions of each arm when the hook is flexed inwardly. When released from being flexed inwardly the ends hook behind the wall of the container thus providing a releasable connection between the hooks and the container. A slideable lock plate prevents unintentional movement of the bail hooks by the poultry.

5 Claims, 7 Drawing Figures

PATENTED AUG 6 1974 3,827,405

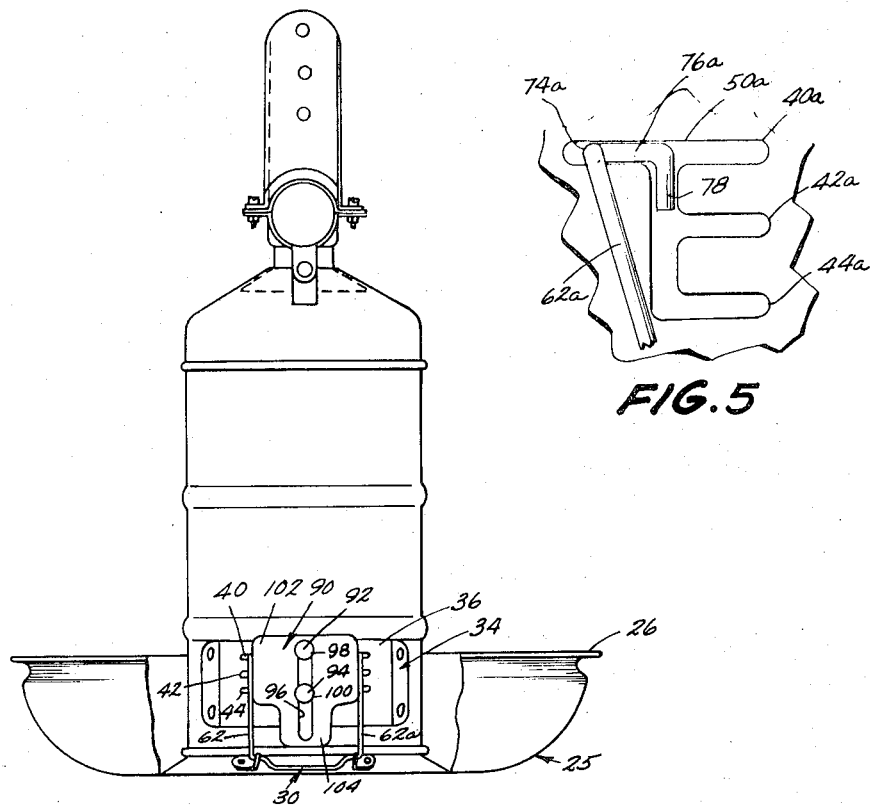
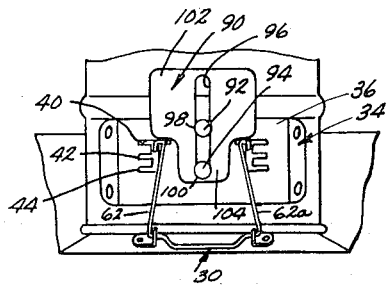
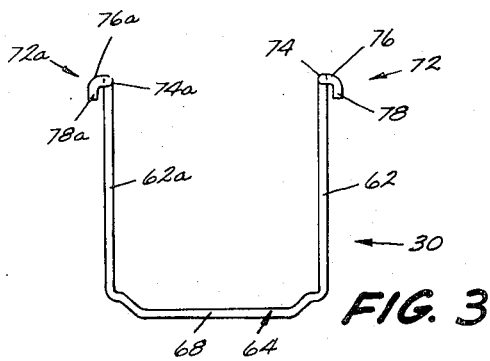 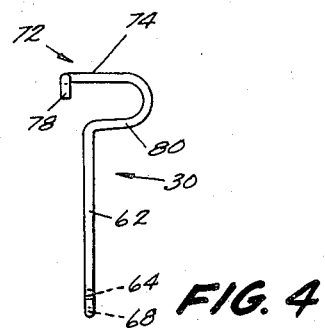

3,827,405

CANISTER BAIL FOR POULTRY FEEDER

BACKGROUND OF THE INVENTION

This invention relates to a poultry feeder and is more particularly directed to a novel hook means utilized to suspend a feed pan from the feed cone at selected levels.

Poultry feed pans suspended from a feed bin or container which is fed continuously from a conveyor have proven highly efficient and economical particularly in large installations. The prior art feeders of the general type herein disclosed include a cup-shaped pan suspended beneath a tubular-shaped feed bin with the bottom of the pan being adjustable relative to the feed bin to supply feed to the pan at a given level. In the past, a plurality of short sections of chain or wire have been employed for suspending the pan from the bottom portion of the bin, each section having a hook by which the position of the chain or wire may be adjusted with respect to the bin. These types of arrangements are unsatisfactory for suspending the feeder on since the chain and wire supplies very little lateral support. Further, the pan cannot be supported on the floor because the container will collapse against the pan. Further, when these types of feeders are suspended above the floor, the chain or wire flexibility are disadvantageous because they do not prevent tilting when the poultry perches on the edge of the pan. Also, the hooks are difficult to manipulate in adjustment.

More recent alternatives have suggested the utilization of a pair of rigid connecting members broadly referred to as bails which include a flexible pair of arms having a lip portion adapted to fit through slots for capture behind the container wall or housing to connect the pan to the container. Although these prior art arrangements do permit level adjustment and floor supporting of the feeder, they have not been entirely successful in that they have been subject to unintentional disengagement and/or height adjustment by the poultry themselves. Thus, there is a need in this art for an improved adjustable support arrangement between the feeding bin and pan of a poultry feeder.

SUMMARY OF THE INVENTION

The poultry feeder of the invention is adapted for overhead suspension or support from the floor. The feeder utilizes an open ended feed bin or container referred to as a canister and a cup-shaped feeding pan supported beneath the canister by a plurality of rigid spacer hooks.

In accordance with the invention, each spacer hook is characterized by a single length of resilient rod-like material having a generally U-shape. The web portion of each hook is pivotally connected to the pan and the free ends of each hook arm include an end portion extending inwardly out of the plane of the spacer. The canister sidewall includes means defining corresponding sets of vertically spaced laterally extending slots interconnected by a vertical slot which permits insertion of the end portions of each arm when the arms are deflected inwardly toward each other. Release of the arms positions them at the outer extremity of the selected horizontal slots with the end portions captured behind the wall of the container. A slidable lock means prevents inward deflection of the arms in one position thereby locking the arms in position and is movable into a second position to permit adjustment of the pan.

In a narrower aspect of the invention, a plate is slideably mounted to the canister over portions of the corresponding sets of slots. The width of a portion of the plate is compatible with the spacing of the hook arms when relaxed to prevent inward deflection. A portion of the plate has a reduced width to permit inward deflection of the spacer hooks for adjustment when the plate is properly positioned.

Preferably, the hook means of the invention provides a hook having both a vertical and horizontal lip portion on each arm which is captured behind the canister wall when the bail is not flexed. This requires proper positioning in only one position relative the slots which will permit height adjustment on insertion or removal of the spacer hook. This greatly reduces accidental or unintentional movement of the feed pan relative the feed canister.

In addition to the hook itself, the unique lock plate is slideably mounted to the canister to eliminate for all intent and purpose any chance of accidental or unintentional movement of the feed pan relative the feed container.

DESCRIPTION OF THE DRAWINGS

FIG. 3 is a front elevational view of the spacer hook of the invention;

FIG. 4 is a side elevation view of the spacer hook illustrated in FIG. 3;

FIG. 5 is a fragmentary enlarged view of the spacer hook flexed inwardly for insertion or removal from the holder.

FIG. 6 is a fragmentary front elevation view of a modification of the embodiment illustrated in FIGS. 1 and 2 with the lock plate illustrated in the locked position; and FIG. 7 is a fragmentary front elevation similar to FIG. 6 illustrating the lock plate in the open position.

DESCRIPTION OF THE PREFERRED EMBODIMENT

Figure 1:
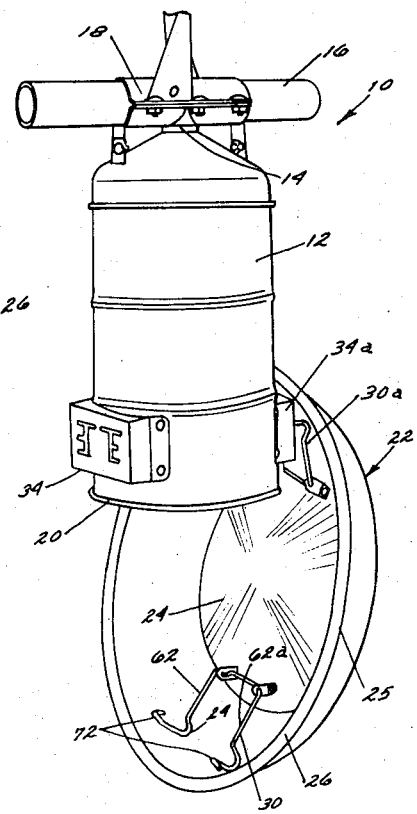
FIG. 1 is a perspective view of a poultry feeder constructed in accordance with the present invention, with the feeding pan being suspended generally vertically for cleaning.

Referring now to the drawings in detail, and especially FIG. 1, a poultry feeding apparatus 10 is shown, comprising an open-ended feeding canister 12 having a tubular configuration. The upper end of canister 12 necks down to a feed inlet 14 which is connected to a feed conveyor tube 16 by a bracket 18. Feed is advanced from a supply bin (not shown) through tube 16 by a chain conveyor (not shown) to maintain feed in canister 12 at a preselected level. While tube 16 is supported by an independent suspension structure not shown, additional strength may be provided by suspending bracket 18 independently by a chain or other support. On the other hand, feeder 10 is adapted for support by a floor in which case the suspension structure is not required.

The bottom end 20 of canister 12 is open and supported therebeneath (FIG. 2) is a feed pan 22 which catches and exposes the feed for the poultry. The bottom 24 of pan 22 is spaced beneath end 20 of canister 12 and the magnitude of this spacing determines the feed level in pan 22. The pan is cup-shaped having an annular side 24, the upper margin 26 of which is normally above the open end 20 during use. Pan 22 is interconnected to canister 12 by a pair of spacer hooks 30, 30a at selected vertical spacings, the details of which will be specifically described hereinafter.

The canister 12 and pan 22 comprising poultry feeder 10 is particularly adapted for turkeys. The canister and pan are preferably comprised of heavy, galvanized steel ribbed for greater strength and rigidity. Less structural rigidity of course is required for chickens. The feeding space 32 on feeder 10 is free of obstruction so that it is easy for many birds to eat collectively at one time. There are no canopies or other metal parts to limit the poultry's access to the feed.

Figure 2:
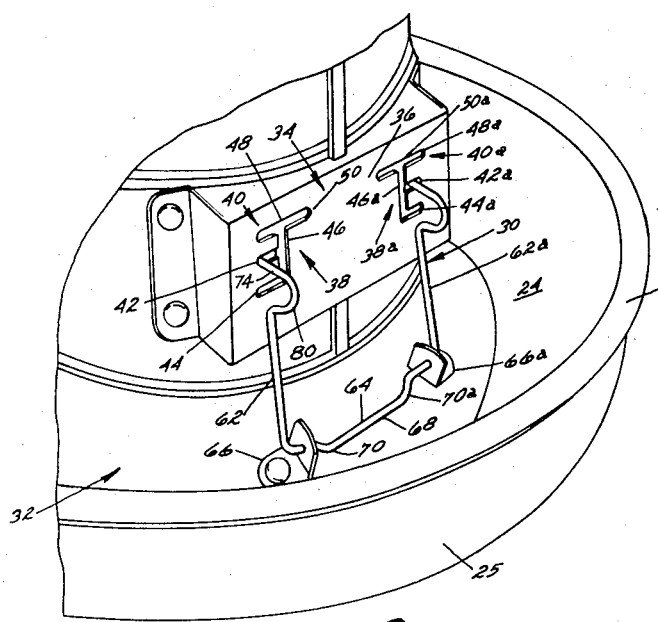
FIG. 2 is a close-up fragmentary perspective view of the feeder illustrated in FIG. 1.

Referring yet to FIGS. 1 and 2, a pair of support housings 34, 34a are affixed to the outer surface of canister 12 along the bottom portion at diametrically opposite positions. Since each housing is identical, only one will be described in detail.

Referring to FIG. 2, the front face 36 of housing 34 is spaced from the side of canister 12 and includes a pair of slotted indices 38, 38a spaced laterally from each other. Referring to the left slotted index 38, three vertically spaced laterally extending slots 40, 42 and 44 are interconnected by a vertical slot 46. The upper slot 40 includes a left branch 48 and a right branch 50 extending equidistantly from each side of vertical slot 46. The left branch 48 corresponds lengthwise to slots 42 and 44. The right index 38a is identical to index 38 except that it is the mirror image thereof and thus slots 42a and 44a extend outwardly in the opposite direction to related slots 42, 44 while the described branches of upper slot 40a are reversed with the right branch 48a corresponding in length and direction to slots 42a, 44a while branch 50a extends inwardly toward corresponding branch 50 of slot 40.

The slotted indices 38, 38a cooperate with spacer hooks 30, 30a to interconnect canister 12 with pan 22. Since each of the spacer hooks 30, 30a are identical with each other, only one will be described. Referring to FIGS. 1 and 2, hook 30 is formed of a single length of metal rod-like material and characterized by an overall general U-shape comprising a pair of laterally spaced arms 62, 62a integrally interconnected by a web portion 64. Web portion 64 is anchored to pan 22 by a pair of L-shaped anchor mounts 66, 66a, one leg of which is secured to the bottom of pan 22 with the other leg extending normally therefrom and having an opening to permit insertion of spacer hook 30. Preferably, the mid portion 68 of web 64 is offset from the remaining portion to provide a stop 70, 70a at each end which prevents substantial relative movement laterally between mounts 66, 66a and spacer hook 30.

Referring to FIGS. 3–5, the free end of each arm 62, 62a terminates in an end portion or lip 72 which forms a hook captured behind the canister wall. Each lip 72 includes a portion 74 or 74a which projects inwardly toward the canister perpendicular to and beyond the overall plane of the spacer hooks defined generally by arms 62, 62a. At the free end of portions 74, 74a, the hook is shaped into a 90° bend outwardly as illustrated by horizontal lip portions 76, 76a (FIGS. 3 and 5). The outward extension is approximately equal to or less than the extensions of branches 48 and 50 to either side of vertical slot 46. The hook is then shaped into a 90° downward bend as illustrated by vertical lip portions 78, 78a.

Spacer hooks 30, 30a are preferably comprised of a resilient metal to permit a person to squeeze arms 30, 30a inwardly toward each other. Upon release however they will return to their original orientation which is generally parallel to each other. The spacing of indices 38, 38a is selected so that when spacer arms 62, 62a are squeezed inwardly toward each other, the upper end portion 72, 72a can be inserted within upper slots 40, 40a. Release at this point however causes arms 62, 62a to return to their normal parallel configuration at which point, the outer sides of each arm come into contact with the outer extremities of slots 40, 40a illustrated as branches 48, 48a. In this position, both the horizontal portions 76, 76a and vertical portions 78, 78a are captured behind frontal face 36 of housing 34 thus preventing removal of hook 30 from the housing.

The operation should be obvious. With the arms flexed inwardly, horizontal lip portions 76, 76a fit through the inward portions of branches 48, 48a (FIG. 5), while the vertical lip portions 78, 78a fit in vertical slots 46, 46a. If the hook 30 is released, the resiliency will cause arms 62 and 62a to move into abutment with the outer ends of branches 48, 48a. If vertical adjustment is desired, the hook 30 must be flexed until portions 74 or 74a of arms 62, 62a are aligned with vertical slots 46, 46a to permit vertical movement of the hook. In all positions other than during insertion or removal, the vertical lip portions 78, 78a prevent removal of the hook 30 from housing 34. Thus, complete vertical adjustment can be achieved without any chance of removing the hooks from the canister since the position for removal is incompatible with the position for adjustment.

The lower surface of slot 40, 40a provides sufficient support to suspend pan 22 in those instances wherein the entire feeder is suspended above and by the floor while the upper surface of the slots provides support for the canister in the event that the pan and feeder is positioned on the floor. To facilitate the manipulation of the spacer hooks, the upper portion of each arm 62, 62a (FIGS. 2 and 3) is shaped in an outwardly extending reverse curve 80 which extends outwardly away from the wall of canister 12 when the hooks are inserted in the slotted indicia. This outwardly bent portion provides an extended cross section on each arm for gripping to facilitate squeezing and manipulating of the spacer hook with one hand. The width of each spacer hook 30 or 30a is preferably compatible with the radius of the feed bin at the point of connection so that a stable four-point circumferential connection is achieved with only two hooks.

Referring back to FIG. 1, it will be appreciated as described previously that each hook 30, 30a may pivot freely relative to bottom 24 of pan 22 about the general axis of web 64. Assuming the feeder 10 is suspended from above as illustrated in FIG. 1, pan 24 can be partially detached from canister 12 by releasing one of the spacer hooks 30 from support housing 34 whereby the pan will pivot about spacer hook 34a into a generally vertical orientation to permit quick and easy cleaning.

Referring now to FIGS. 6 and 7, a modification of the embodiment illustrated in FIGS. 1 and 2 is shown which utilizes a lock plate 90 slidably anchored to the front face 36 of housing 34. A pair of posts 92 and 94 are spaced vertically from each other and welded or otherwise secured to the center of housing 34. Plate 90 has an elongated slot 96 through which the posts extend. Enlarged ends 98 and 100 capture the plate 90 to housing 34 so that it cannot be removed although it is slidable vertically between a lower position illustrated in FIG. 6 with post 92 preventing further downward movement to an upper position shown in FIG. 7 with post 94 preventing further upward movement.

The upper portion 102 of plate 90 has a greater width than the lower portion 104. The width of the upper portion is selected so that it extends roughly the width or spacing of the arms of either spacer hooks 30. With one of the spacer hooks 30 positionably engaged in a captured position of the slots 40, 42 or 44, the spacer hook is physically prevented from inward flexing if the lock plate 90 is in the lower position as illustrated in FIG. 6. This bars accidental or unintentional release of the spacer hook from the selected position. If it is desired to change the selected position, plate 90 must be moved upwardly so that the reduced width portion 104 comes into play permitting spacer hooks 30 to be flexed inwardly as illustrated in FIG. 7. In this position, the height of pan 22 can be adjusted whereupon lock plate 90 is released so that it slides into the downward position once more locking the spacer hook into place.

The poultry feeder described herein provides a relatively simplified arrangement which is not only easy to operate but prevents accidental removal or adjustment of the pan by the poultry or operator. The unique spacer hook configuration prevents removal or insertion of the hook from the canister in the same position required for height adjustment and vice versa. On the other hand, if absolute protection is desired against inadvertent pan movement, the unique lock plate arrangement can be utilized.

Although more than one embodiment has been shown and described in detail, it will be obvious to those having ordinary skill in this art that the details of construction of these particular embodiments may be modified in a great many ways without departing from the unique concepts presented. It is therefore intended that the invention is limited only by the scope of the appended claims rather than by particular details of construction shown, except as specifically stated in the claims.

The embodiments of the invention in which an exclusive property or privilege is claimed are defined as follows.

1. In a poultry feeder of the type having an upright open bottomed feed canister and a cup-shaped feeding pan adjustably secured to said canister by a plurality of spacer hooks connected to said pan and detachably engageable with wall means on said canister for interconnecting said pan to said canister at different vertical spacings, the improvement comprising, in combination: each spacer hook being characterized by a single length of rod-like material having an overall U-shape comprising a pair of arms interconnected by a web, said pan being connected to each of said hooks at said web whereby each of said hooks can pivot about the axis of said web relative to the bottom of said pan, the upper free ends of said arms including a lip portion cooperatively engageable with said wall means, said wall means defining a set of vertically spaced, horizontally extending slots for each arm and lip portion, said horizontal slots being interconnected by a vertical slot, said lip portion including a first portion bent inwardly from said arm for insertion through one of said slots, said arms being resilient and in their relaxed inserted position being spaced a distance different than the spacing between a selected pair of vertical slots such that said lip portions are captured behind said wall means said resiliency thereof permitting flexation of said arms allowing said lip portion to be aligned with said vertical slot to permit insertion or removal of said hook with said wall means and to permit vertical height adjustment of said pan relative said canister; and lock means for positively securing said hooks in a selected set of slots, said lock means including a plate anchored to said means, said plate being slidable vertically relative said means and having a first portion, the width of which is generally equal to the spacing of said hook arms in said relaxed position and a second portion having a width less than said first portion, said plate being slidable between a locked position wherein said first portion is positioned between said hook arms when said hook is interconnected with said means, said plate preventing said hook arms from being flexed inwardly for removal or adjustment, and an open position wherein the second portion of said plate is positioned intermediate said hook arms when said hook is interconnected with said means, the width of said second portion permitting said hook arms to be flexed inwardly for insertion, removal, or adjustment.

2. The improvement according to claim 1 wherein said plate includes an elongated vertically extending slot and said means includes a pair of vertically spaced posts projecting outwardly whereby said posts extend through said slot and said plate is slidable between said first and second positions, said posts including an enlarged free end capturing said plate intermediate said means and enlarged ends.

3. In a feeder of the type having an upright open bottomed feed canister and a cup-shaped feeding pan adjustably secured to said canister by a plurality of spacer hooks connected to said pan and detachably engageable with means on said canister for interconnecting said pan to said canister at different vertical spacings, the improvement comprising: each spacer hook being characterized by a single length of rod-like material having an overall U-shape comprising a pair of arms interconnected by a web, the upper free ends of said arms including a lip portion cooperatively engageable with said means, said means defining a plurality of vertically spaced, horizontally extending slots for receiving said lip portion, said arms being resilient and flexible such that by flexing said arms toward each other, said lip portions can be inserted into a selected pair of said slots and when released, said lip portions are captured behind said wall, and slidable lock means for positively securing said hooks in a selected set of slots said lock means comprising means slidable between said pair of arms between a first position wherein said lock means prevents inward flexing of said arms toward each other and a second position wherein inward flexing is permitted.

4. The improvement according to claim 3 wherein said lock means includes a plate anchored to said means, said plate being slidable vertically relative said means and having a first portion, the width of which is generally equal to the spacing of said hook arms in said relaxed position and a second portion having a width less than said first portion, said plate being slidable between a locked position wherein said first portion is positioned between said hook arms when said hook is interconnected with said means, said plate preventing said hook arms from being flexed inwardly for removal or adjustment, and an open position wherein the second portion of said plate is positioned intermediate said hook arms when said hook is interconnected with said means, the width of said second portion permitting said hook arms to be flexed inwardly for insertion or removal.

5. The improvement according to claim 4 wherein said plate includes an elongated vertically extending slot and said means includes a pair of vertically spaced posts projecting outwardly whereby said posts extend through said slot and said plate is slidable between said first and second positions, said posts including an enlarged free end capturing said plate intermediate said means and enlarged ends.

* * * * *